United States Patent
Ilchenko et al.

(10) Patent No.: US 7,389,053 B1
(45) Date of Patent: *Jun. 17, 2008

(54) TUNABLE FILTERING OF RF OR MICROWAVE SIGNALS BASED ON OPTICAL FILTERING IN MACH-ZEHNDER CONFIGURATION

(75) Inventors: Vladimir Ilchenko, Arcadia, CA (US); Lutfollah Maleki, Pasadena, CA (US)

(73) Assignee: OEwaves, Inc., Pasadena, CA (US)

( * ) Notice: Subject to any disclaimer, the term of this patent is extended or adjusted under 35 U.S.C. 154(b) by 590 days.

This patent is subject to a terminal disclaimer.

(21) Appl. No.: 11/035,020

(22) Filed: Jan. 12, 2005

Related U.S. Application Data

(63) Continuation-in-part of application No. 10/963,755, filed on Oct. 12, 2004, now Pat. No. 7,187,870.

(60) Provisional application No. 60/511,431, filed on Oct. 15, 2003, provisional application No. 60/535,952, filed on Jan. 12, 2004.

(51) Int. Cl.
*H04B 10/04* (2006.01)
(52) U.S. Cl. ............... 398/183; 398/182; 398/185; 398/187; 398/201; 372/28; 372/32; 385/2; 385/28
(58) Field of Classification Search ........ 398/182–201, 398/149; 372/32, 28, 12, 18, 26; 385/2, 385/8, 28
See application file for complete search history.

(56) References Cited

U.S. PATENT DOCUMENTS 4,730,301 A * 3/1988 McMahon ............ 398/79
5,204,640 A 4/1993 Logan
5,220,292 A 6/1993 Bianchini et al.
5,239,400 A * 8/1993 Liu ....................... 398/95
5,594,577 A 1/1997 Majima et al.
5,723,856 A 3/1998 Yao et al.
5,751,747 A 5/1998 Lutes et al.
5,777,778 A 7/1998 Yao
5,917,179 A 6/1999 Yao
5,929,430 A 7/1999 Yao et al.
5,985,166 A 11/1999 Unger et al.
6,080,586 A 6/2000 Baldeschwieler et al.
6,178,036 B1 1/2001 Yao
6,203,660 B1 3/2001 Unger et al.
6,389,197 B1 5/2002 Iltchenko et al.

(Continued)

FOREIGN PATENT DOCUMENTS

EP 1 158 318 11/2001

(Continued)

OTHER PUBLICATIONS

Logan, et al.; Stabilization of Oscillator Phase Using a Fiber-Optic Delay-Line; 1991; 45th Annual Symposium on Frequency Control; pp. 508-512.

(Continued)

*Primary Examiner*—Kenneth N. Vanderpuye
*Assistant Examiner*—Phyowai Lin
(74) *Attorney, Agent, or Firm*—Fish & Richardson P.C.

(57) ABSTRACT

Devices and techniques for achieving signal filtering in RF or microwave frequencies by optical filtering using two separate optical paths. Each optical path may include one or more optical resonators to achieve desired optical filtering.

17 Claims, 7 Drawing Sheets

U.S. PATENT DOCUMENTS

| | | | |
|---|---|---|---|
| 6,417,957 B1 | 7/2002 | Yao | |
| 6,473,218 B1 | 10/2002 | Maleki et al. | |
| 6,476,959 B2 | 11/2002 | Yao | |
| 6,487,233 B2 | 11/2002 | Maleki et al. | |
| 6,488,861 B2 | 12/2002 | Iltchenko et al. | |
| 6,490,039 B2 | 12/2002 | Maleki et al. | |
| 6,535,328 B2 | 3/2003 | Yao | |
| 6,567,432 B1* | 5/2003 | Kim et al. | 372/6 |
| 6,567,436 B1 | 5/2003 | Yao et al. | |
| 6,580,532 B1 | 6/2003 | Yao et al. | |
| 6,594,061 B2 | 7/2003 | Huang et al. | |
| 6,731,180 B1* | 5/2004 | Clark et al. | 331/176 |
| 6,762,869 B2 | 7/2004 | Maleki et al. | |
| 6,795,481 B2* | 9/2004 | Maleki et al. | 372/108 |
| 6,798,947 B2 | 9/2004 | Iltchenko | |
| 6,853,479 B1 | 2/2005 | Ilchenko et al. | |
| 6,871,025 B2 | 3/2005 | Maleki et al. | |
| 6,873,631 B2* | 3/2005 | Yao et al. | 372/32 |
| 6,879,752 B1 | 4/2005 | Ilchenko et al. | |
| 6,901,189 B1 | 5/2005 | Savchenkov et al. | |
| 6,907,156 B1 | 6/2005 | Madsen | |
| 6,922,497 B1 | 7/2005 | Savchenkov et al. | |
| 6,928,091 B1 | 8/2005 | Maleki et al. | |
| 6,943,934 B1 | 9/2005 | Ilchenko et al. | |
| 6,987,914 B2 | 1/2006 | Savchenkov et al. | |
| 7,024,069 B2 | 4/2006 | Savchenkov et al. | |
| 7,043,117 B2 | 5/2006 | Matsko et al. | |
| 7,050,212 B2 | 5/2006 | Matsko et al. | |
| 7,058,258 B2* | 6/2006 | Yamazaki | 385/27 |
| 7,061,335 B2* | 6/2006 | Maleki et al. | 331/66 |
| 7,062,131 B2 | 6/2006 | Ilchenko | |
| 7,092,591 B2 | 8/2006 | Savchenkov et al. | |
| 7,133,180 B2 | 11/2006 | Ilchenko et al. | |
| 7,173,749 B2 | 2/2007 | Maleki et al. | |
| 7,184,451 B2 | 2/2007 | Ilchenko et al. | |
| 7,187,870 B2* | 3/2007 | Ilchenko et al. | 398/161 |
| 7,218,662 B1 | 5/2007 | Ilchenko et al. | |
| 7,248,763 B1 | 7/2007 | Kossakovski et al. | |
| 7,260,279 B2 | 8/2007 | Gunn et al. | |
| 7,283,707 B1 | 10/2007 | Maleki et al. | |
| 2001/0004411 A1* | 6/2001 | Yariv | 385/28 |
| 2002/0018611 A1 | 2/2002 | Maleki et al. | |
| 2002/0081055 A1 | 6/2002 | Painter et al. | |
| 2002/0085266 A1 | 7/2002 | Yao | |
| 2003/0012504 A1 | 1/2003 | Iltchenko | |
| 2003/0231826 A1* | 12/2003 | Boyd et al. | 385/27 |
| 2004/0100675 A1 | 5/2004 | Matsko et al. | |
| 2004/0218880 A1 | 11/2004 | Matsko et al. | |
| 2004/0234273 A1* | 11/2004 | Sayyah et al. | 398/149 |
| 2004/0240781 A1 | 12/2004 | Savchenkov et al. | |
| 2005/0017816 A1 | 1/2005 | Ilchenko et al. | |
| 2005/0074200 A1 | 4/2005 | Savchenkov et al. | |
| 2005/0128566 A1 | 6/2005 | Savchenkov et al. | |
| 2005/0175358 A1 | 8/2005 | Ilchenko et al. | |
| 2005/0220411 A1* | 10/2005 | Ilchenko | 385/39 |
| 2007/0009205 A1 | 1/2007 | Maleki et al. | |
| 2007/0153289 A1 | 7/2007 | Yilmaz et al. | |
| 2008/0001062 A1 | 1/2008 | Gunn et al. | |

FOREIGN PATENT DOCUMENTS

| | | |
|---|---|---|
| WO | WO 01/96936 | 12/2001 |
| WO | WO 2005/038513 | 4/2005 |
| WO | WO2005/055412 | 6/2005 |
| WO | WO 2005/067690 | 7/2005 |

OTHER PUBLICATIONS

L.E. Myers, et al.; Quasi-phase-matched optical parametric oscillators in bulk periodically poled LiNbO$_3$; Nov. 1995; J.Opt. Soc. Am. B/vol. 12, No. 11; pp. 2102-2116.

X. Steve Yao, et al.; Converting Light into Spectrally Pure Microwave Oscillation; Apr. 1996; Optics Letters, vol. 21, No. 7, pp. 483-485.

H. Ito, et al.; InP/InGaAs uni-travelling-carrier photodiode with 310 GHz receiver; Oct. 12, 2000; Electronics Letters, vol. 36, No. 21; pp. 1809-1810.

V. Ilchenko, et al.; Sub-Micro Watt Photonic Microwave Receiver; Nov. 2002; IEEE Photonics Technology Letters, vol. 14, No. 11; pp. 1602-1604.

Braginsky, et al., "Quality-Factor and Nonlinear Properties or Optical Whispering-Gallery Modes", Physics Letters A, vol. 137, Nos. 7, 8, pp. 393-397, May 29, 1989.

Gorodetsky et al., "Optical microsphere resonators: optimal coupling to high-Q whispering-gallery modes," J.Opt. Soc. Am. B. vol. 16, No. 1, pp. 147-154 (Jan. 1999).

Gorodetsky et al., "Ultimate Q of optical microsphere resonators," Optic Letters 21(7): 453-455 (Apr. 1, 1996).

Gorodetsky, et al., "Rayleigh scattering in high-Q microspheres", J. Opt. Soc. Am. B, vol. 17, No. 6, pp. 1051-1057, Jun. 2000.

Hryniewicz, et al., "Higher Order Filter Response in Coupled Microring Resontors", IEEE Photonics Technology Letters, vol. 12, No. 3, pp. 320-323, Mar. 2000.

Ilchenko et al., "Electrooptically Tunable Photonic Microresonators and Photonic Bandgap Waveguide Coupling for Micro-Optoelectronic Oscillators," GOMACTech 2003, Tampa, Florida, pp. 1-4.

Ilchenko et al., "High-Q microsphere cavity for laser stabilization and optoelectronic microwave oscillator," Proceedings SPIE, vol. 3611, p. 190-198 (1999).

Ilchenko et al., "Microsphere integration in active and passive photonics devices," Kudryashov, et al., (Eds.) Laser Resonators III, Proceedings of SPIE, vol. 3930, pp. 154-162, San Jose, California, Jan. 26-28, 2000.

Ilchenko et al., "Microtorus: a high-finesse microactivity with whispering-gallery modes," Optics Letters, vol. 26, No. 5, pp. 256-258 (Mar. 2001).

Ilchenko et al., "Pigtailing the high-Q microsphere cavity: a simple fiber coupler for optical whispering-gallery modes," Optics Letters, vol. 24, No. 11, pp. 723-725 (Jun. 1, 1999).

Ilchenko, et al., "Tunability and synthetic lineshapes in high-Q optical whispering gallery modes", Proc. Of SPIE, vol. 4969, pp. 195-206, 2003.

Ilchenko, et al., "Whispering-gallery-mode electro-optic modulator and photonic microwave receiver", J. Opt. Soc. Am. B., vol. 20, No. 2, pp. 333-342, February, 200.

Maleki, L., "The Opto-Electronic Oscillator: Prospects for Extending the State-of-the-Art in Reference Frequency Generation," in International Topical Meeting on Microwave Photonics Conference, Oct. 12-14, 1998, Princeton, New Jersey.

Matsko, et al., "Active mode locking with whispering-gallery modes", J. Opt. Soc. Am. B., vol. 20, No. 11, pp. 2292-2296, Nov. 2003.

Matsko, et al., "Whispering gallery mode based optoelectronic microwave oscillator", Journal of Modern Optics, vol. 50, No. 15-17, pp. 2523-2542, 2003.

Vassiliev, et al., "Narrow-line-width diode laser with a high-Q microsphere resonator", Optics Communications, vol. 158, pp. 305-312, Dec. 15, 1998.

Yao et al., "Coupled Optoelectronic Oscillators for Generating Both RF Signal and Optical Pulses," Journal of Lightwave Tecnhology, vol. 18, No. 1, pp. 73-78 (Jan. 2000).

Yao et al., "Dual microwave and optical oscillator," Optics Letters, vol. 22, No. 24, pp. 1867-1869 (Dec. 15, 1997).

Yao et al., "Multiloop Optoelectronic Oscillator," IEEE Journal of Quantum Electronics, vol. 36, No. 1, pp. 79-84 (Jan. 2000).

Yao et al., "Optoelectronic Oscillator for Photonic Systems," IEEE Journal of Quantum Electronics, vol. 32, No. 7, pp. 1141-1149 (Jul. 1996).

Yao, et al., "A Novel Photonic Oscillator", IEEE/LEOS 1995 Summer Topical Meetings, Keystone, Colorado, Aug. 9-11, 1995, pp. 17-18.

Yao, X.S. and L. Maleki et al., "Optoelectronic microwave oscillator," J. Opt. Soc. Am. B., vol. 13, No. 8, pp. 1725-1735 (Aug. 1996).

Yao, X.S. and L. Maleki., "A Novel Photonic Oscillator," TDA Progress Report 42-122, pp. 32-43 (Aug. 15, 1995).

Yu et al., "Compact optoelectronic oscillator with ultra-low phase noise performance," Electronics Letters, vol. 35, No. 18, pp. 1554-1555 (1999).

* cited by examiner

TUNABLE FILTERING OF RF OR MICROWAVE SIGNALS BASED ON OPTICAL FILTERING IN MACH-ZEHNDER CONFIGURATION

This application is a continuation-in-part application of U.S. patent application Ser. No. 10/963,755 entitled "TUNABLE BALANCED OPTO-ELECTRONIC FILTERS AND APPLICATIONS IN OPTO-ELECTRONIC OSCILLATORS" and filed Oct. 12, 2004 now U.S. Pat. No. 7,187,870 which claims the benefit of U.S. Provisional Patent Application No. 60/511,431 entitled "BALANCED OPTO-ELECTRONIC FILTER FOR TUNABLE OPTO-ELECTRONIC OSCILLATOR" and filed Oct. 15, 2003.

This application further claims the benefit of U.S. Provisional Patent Application No. 60/535,952 entitled "RECONFIGURABLE PHOTONICS SYNTHETIC FILTER BASED ON TUNABLE ELECTRO-OPTIC $LINBO_3$ RESONATORS" and filed Jan. 12, 2004.

The entire disclosures of the above three patent applications are incorporated herein by reference as part of the specification of this application.

FEDERALLY FUNDED RESEARCH STATEMENT

The research and development for certain technical features of inventions described in this application received funding under Contract No. DAAD17-02-C-0085 from Army Research Laboratory. The U.S. Government may have rights to these technical features.

BACKGROUND

This application relates to optical and photonic devices for various applications, such as optical, radio frequency (RF), and microwave applications.

Optical devices may be used to manipulate or control light for applications where signals are not in the optical frequencies. As an example, RF and microwave oscillators for generating signals in the RF and microwave frequencies may be constructed as "hybrid" devices by using both electronic and optical components to form opto-electronic oscillators ("OEOs"). See, e.g., U.S. Pat. Nos. 5,723,856, 5,777,778, 5,929,430, and 6,567,436. Such an OEO includes an electrically controllable optical modulator and at least one active opto-electronic feedback loop that comprises an optical part and an electrical part interconnected by a photodetector. The opto-electronic feedback loop receives the modulated optical output from the modulator and converted it into an electrical signal to control the modulator. The feedback loop produces a desired long delay in the optical part of the loop to suppress phase noise and feeds the converted electrical signal in phase to the modulator to generate and sustain both optical modulation and electrical oscillation in RF or microwave frequencies when the total loop gain of the active opto-electronic loop and any other additional feedback loops exceeds the total loss. The generated oscillating signals are tunable in frequency and can have narrow spectral linewidths and low phase noise in comparison with the signals produced by other RF and microwaves oscillators.

SUMMARY

This application describes, among others, tunable filters in, e.g., RF and microwave frequencies and their applications such as tunable opto-electronic oscillators. The described tunable filters are designed to perform the filtering and tuning of RF and microwave signal optically.

In one implementation, an optical carrier beam at an optical carrier frequency is split into a first beam and a second beam. The optical carrier beam is modulated to carry a plurality of signal bands at frequencies different from the optical carrier frequency. The first beam is directed through a first optical path to transmit only light at the optical carrier frequency. The second beam is directed through a second, separate optical path to transmit only light at a selected signal band. The transmitted light from the first and second optical paths are combined to produce an optical output. An optical detector is used to receive the optical output and to recover the selected signal band.

A device is described to include an input port to receive an input optical beam at an optical carrier frequency, a first optical path, and a second optical path. The first optical path is coupled to the input port to receive a first portion of the input optical signal and includes a first optical resonator locked in frequency to be resonant at the optical carrier frequency to transmit light at the optical carrier frequency through the first optical path. The second optical path is coupled to the input port to receive a second portion of the input optical signal and includes a second optical resonator, which is tunable to be in resonance with light at a selected optical frequency different from the optical carrier frequency, to transmit light at the selected optical frequency through the second optical path. This device also includes an output port coupled to the first and second optical paths to combine transmitted light from the first and second optical paths to produce an output optical beam, and an optical detector to convert the output optical beam into a detector output carrying a signal at a frequency that is a difference between the optical carrier frequency and the selected optical frequency.

The above device may further include an optical modulator located to modulate light before the light enters the second optical resonator in response to a modulation control signal to produce a modulated optical beam at least part of which is directed into the second optical resonator. The optical modulator may be located to modulate light prior to entry of the input port or located in the second optical path between the input port and the second optical resonator. A feedback unit may be provided to supply the modulation control signal to form an opto-electronic oscillator.

This application describes another device which includes equal first and second optical paths that respectively include first and second optical resonators. The two optical paths split an input optical beam into a first optical beam into the first optical path and a second optical beam into the second optical path, and to combine light from the first and second optical paths as an optical output. The first optical resonator is coupled in the first optical path and locked to an optical carrier frequency of the input optical beam. The second optical resonator is coupled in the second optical path and is configured to exhibit an electro-optic effect and tunable in response to an electrical tuning signal to change a spectral difference of a resonance in the second optical resonator closest to the optical carrier frequency.

This application further describes a device that includes an input port to receive an input optical beam at an optical carrier frequency, a first optical path coupled to the input port to receive a first portion of the input optical signal and comprising a first optical resonator at a first resonance frequency to transmit light at the first resonance frequency through the first optical path, and a second optical path coupled to the input port to receive a second portion of the input optical signal and comprising a second optical resonator. The second optical resonator is tunable to be in resonance with light at a second resonance frequency different from the first resonance frequency and to transmit light at the second resonance frequency through the second optical path. An output port is coupled to the first and second optical paths to combine transmitted light from the first and second optical paths to produce an output optical beam.

Yet another device described includes means for splitting an optical carrier beam at an optical carrier frequency into a first beam and a second beam, means for modulating at least the second beam to carry a plurality of signal bands at frequencies different from the optical carrier frequency, means for directing the first beam through a first optical path to transmit only light at the optical carrier frequency, means for directing the second beam through a second, separate optical path to transmit only light at a selected signal band, means for combining transmitted light from the first and second optical paths to produce an optical output, and means for converting the optical output into an electrical signal to recover the selected signal band.

Furthermore, this application describes a device which includes a laser to produce a laser beam at a laser carrier frequency, an optical modulator to modulate the laser beam in response to an input signal to produce a modulated laser beam that carries the input signal, an input optical port to receive the modulated laser beam, a first optical path coupled to the input optical port to receive a first portion of the modulated laser beam and comprising a plurality of first tunable optical resonators optically cascaded to transmit light at the laser carrier frequency through the first optical path, a second optical path coupled to the input optical port to receive a second portion of the modulated laser beam and comprising a plurality of second tunable optical resonators optically cascaded to transmit light at a selected optical frequency different from the laser carrier frequency through the second optical path, an output optical port coupled to the first and second optical paths to combine transmitted light from the first and second optical paths to produce an output optical beam, and an optical detector to convert the output optical beam into an output signal carrying a signal component of the input signal at a frequency that is a difference between the optical carrier frequency and the selected optical frequency. This device may also include a device control to control the first tunable optical resonators to lock the laser carrier frequency to optical transmission of the first tunable optical resonators and to control the second tunable optical resonators to tune the selected optical frequency relative to the laser carrier frequency.

These and other implementations and their applications are described in greater detail in the attached drawings, the following detailed description, and the claims.

DETAILED DESCRIPTION

Figure 1:
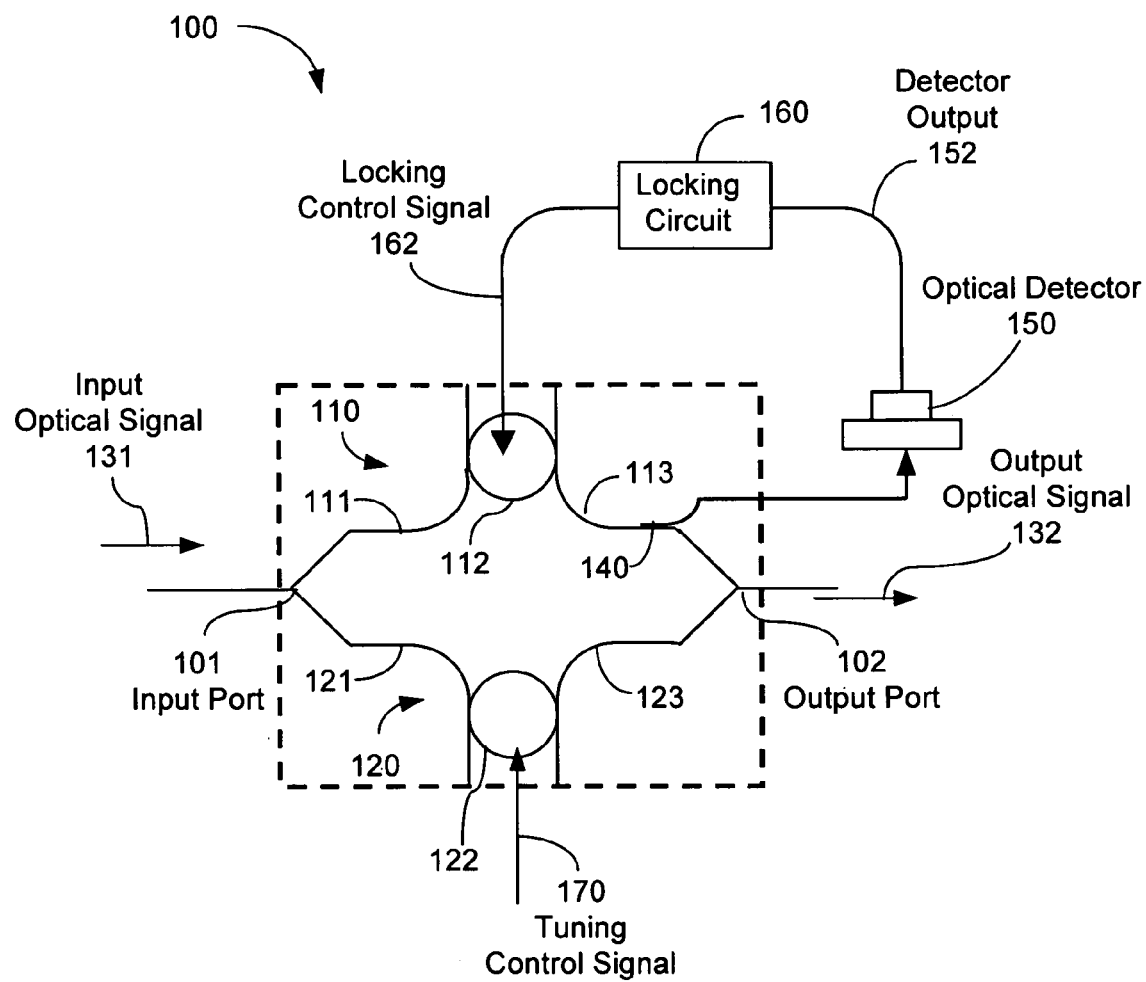
FIG. 1 shows an example of a tunable RF or microwave filter based on optical filtering with two optical resonators.

Various implementations of the techniques and devices described in this application use two optical resonators as passband filters to filter light in two optical paths to effectuate a tunable filter. In implementation, such devices may use an input port to receive an input optical beam, a first optical path coupled to the input port to receive a first portion of the input optical signal, and a second optical path coupled to the input port to receive a second portion of the input optical signal. The first optical path has a first optical resonator at a first resonance frequency to transmit light at the first resonance frequency through the first optical path. The second optical path has a second optical resonator, which is tunable to be in resonance with light at a second resonance frequency different from the first resonance frequency, to transmit light at the second resonance frequency through the second optical path. An output port is coupled to the first and second optical paths to combine transmitted light from the first and second optical paths to produce an output optical beam.

Therefore, the output optical-beam in the output port must have two spectral components at the resonance frequencies of the first and second resonators. When an optical detector is used to receive the output optical beam, the beat signal of two spectral components in a photodetector is converted into RF signal at the beat frequency which is a difference between the first and second optical resonance frequencies. When the second optical resonator is tuned relative to the first optical resonator, the allowed beat frequency of the converted signal changes accordingly to provide a tunable filtering operation. The detuning between the first and second optical resonators may be in the RF or microwave frequencies by controlling the frequency difference between the resonators as an RF or microwave passband or notch filter. Different from conventional RF or microwave notch filters, the devices described here perform the filtering in the optical domain by filtering light carrying the RF or microwave signals through two optical resonators in order to effectuate filtering in the RF or microwave domain.

For example, an optical beam at an optical carrier frequency may be modulated to include sidebands to carry RF or microwave signals. The first optical resonator may be locked in frequency to the optical carrier frequency. The second optical resonator may be tuned to select a desired sideband to transmit to the output port while rejecting the optical components at the optical carrier frequency and other sidebands. At the optical detector, the RF or microwave signal in the selected sideband is detected due to the beating between the optical carrier selected by the first optical resonator and the sideband selected by the second optical resonator. The first and second optical resonators may be designed to have sufficiently narrow optical spectral linewidths to transmit only optical spectral components within a selected band while rejecting light from adjacent bands.

FIG. 1 shows a tunable filter 100A as one example of the devices described here. The filter 100A has an optical input port 101 to receive an input optical signal 131 and an optical output port 102 to export an output signal 132. The input port 101 is coupled to first and second optical paths 110 and 120, respectively, to split the input signal 131 into a first signal to the first optical path 110 and a second optical signal to the second optical path 120. The two optical paths 110 and 120 are combined at the output port 102. In the examples described here, the first and second optical paths 110 and 120 have equal optical path lengths but different optical spectral transmission properties.

The first optical path 110 as illustrated includes optical path 111, a first optical resonator 112, and a second optical path 113 optically connected in series. The optical paths 111 and 113 may be waveguides such as waveguides formed on a substrate or fibers. The first optical resonator 112 is optically connected between the paths 111 and 113 to filter light from the path 111 and sends transmitted light to the path 113. As illustrated, the optical resonator 112 may be a ring resonator, a whispering gallery mode sphere resonator, or a whispering gallery mode disk resonator. The coupling between the resonator 112 and the paths 111 and 113 may be evanescent coupling. The second optical path 120 is similarly constructed with a first optical path 121, a second optical resonator 122, and a second optical path 123 optically connected in series between the input port 101 and the output port 102. To a certain extent, the general optical layout of this two-path design resembles a typical optical Mach-Zehnder interferometer which operates by splitting an optical beam into two optical paths and then combining the light from the two optical paths together to interfere. The presence of the first and second optical resonators 112 and 122, however, makes the filter 110A very different from Mach-Zehnder interferometers in device structure, device operation, and device function.

The first optical resonator 112 may be a tunable resonator and the first resonance frequency is controlled or stabilized at a desired reference frequency. The second optical resonator 122 is then tuned relative to the first resonance frequency to select a sideband carried the input signal 131. In many applications, the first resonance frequency is locked to the optical carrier frequency in the input signal 131 by, for example, dynamically adjusting the first optical resonator to reduce any deviation in frequency from the optical carrier frequency.

FIG. 1 shows a feedback locking circuit 160 for such dynamic control of the first resonator 112. An optical coupler 140 is used to tap a fraction of light transmitted through the first optical resonator 112 in the path 113. An optical detector 150 is used to convert the received light into a detector output 152. The locking circuit 160 produces a locking control signal 162 in response to the detector output 152 to adjust the resonance frequency of the resonator 112. The resonator 112 may be tunable by a suitably tuning mechanism, e.g., by thermal control of the resonator whose index, dimension, or both change with temperature, mechanical control of the resonator by changing the dimension of the resonator, electrical control, or optical control. More specifically, an electro-optic material may be used in the resonator 122 to control and tune the resonance frequency by an external control signal. The resonator 112 may be a tunable WGM resonator. Similarly, the resonator 122 in the second optical path 120 may also be tuned by any of the tuning methods described above. To tune the filter 100A, an external tuning control signal 170 is applied to the resonator 122 to tune the frequency spacing between the first and second resonance frequencies.

For example, both resonators 112 and 122 may be tunable electro-optic resonators. Under this implementation, the filter 100A is an electro-optically tunable filter to serve as side-band frequency selective element in photonic RF or microwave systems. An Opto-Electronic Oscillator (OEO) may include one electro-optic filter based on high-Q lithium niobate resonators in the configuration in FIG. 1. In one implementation of the design in FIG. 1, an electro-optically tunable photonic RF filter is based on the balanced operation of two identical Electro-Optical (EO) resonators 112 and 122 serving as optical filter elements in equal arms 110 and 120 of a Mach-Zehnder interferometer. The free spectral range (FSR) of the resonators 112 and 122 is chosen to exceed the doubled maximum operational frequency of the filter. As an example, the FSR of each resonator should be 30 GHz for stable operation of the filter in a tuning range of 0-15 GHz. One of the arms of the interferometer has a tapping coupler that allows to lock the resonator 112 in the corresponding arm by adjusting the DC voltage applied to the resonator 112 so as to maintain constant transmission of the laser power at its frequency serving as eventual optical carrier frequency for operation of the photonic filter or OEO. A second DC control voltage can be applied to the second resonator 122 to change the relative position of its closest optical resonance with respect to the optical carrier, and thereby define the operational frequency of the photonic filter or OEO. This voltage will also track the variations of the locking DC voltage of the carrier-stabilized OE resonator 112. Because one of the resonators 112 and 122, i.e., the resonator 112 in the illustrated examples, is locked to track the frequency of the input laser, the tuning control voltage on the second filter 122 is corrected correspondingly to maintain the desired frequency offset which is the target RF frequency of the sideband filtering. For example, if the electrical sensitivities of the two tunable resonators 112 and 122 are equal, the tuning control voltage 170 applied to the resonator 122 can be the sum of an external proportional regulation voltage and a copy of the locking control signal 162 where the copy of the signal 162 sets the resonator 122 at the same resonance of the resonator 112 in tracking the input laser frequency while the external regulation voltage provides the detuning in the resonator 122 from the resonance of the resonator 112 to target a desired RF or WM frequency to filter. A separate control circuit is used to generate this control voltage 170. Both signals from the two optical arms recombine at the output port 102 with an equal phase after the Mach-Zehnder interferometer, and can then be detected for the filtering operation, or delayed and detected for the subsequent feedback into an optical modulator in an opto-electronic oscillator.

This balanced design may be used to achieve two main goals among other operation features and advantages. First, the discriminated phase noise of the laser that would otherwise be observed at the detector after the filter can be minimized or canceled as the parasitic amplitude modulation. Second, the relative thermal detuning between the two resonators 112 and 122 can be minimized by placing both resonators 112 and 122 on a relatively massive common substrate with a very high thermal conductivity.

Figure 2:
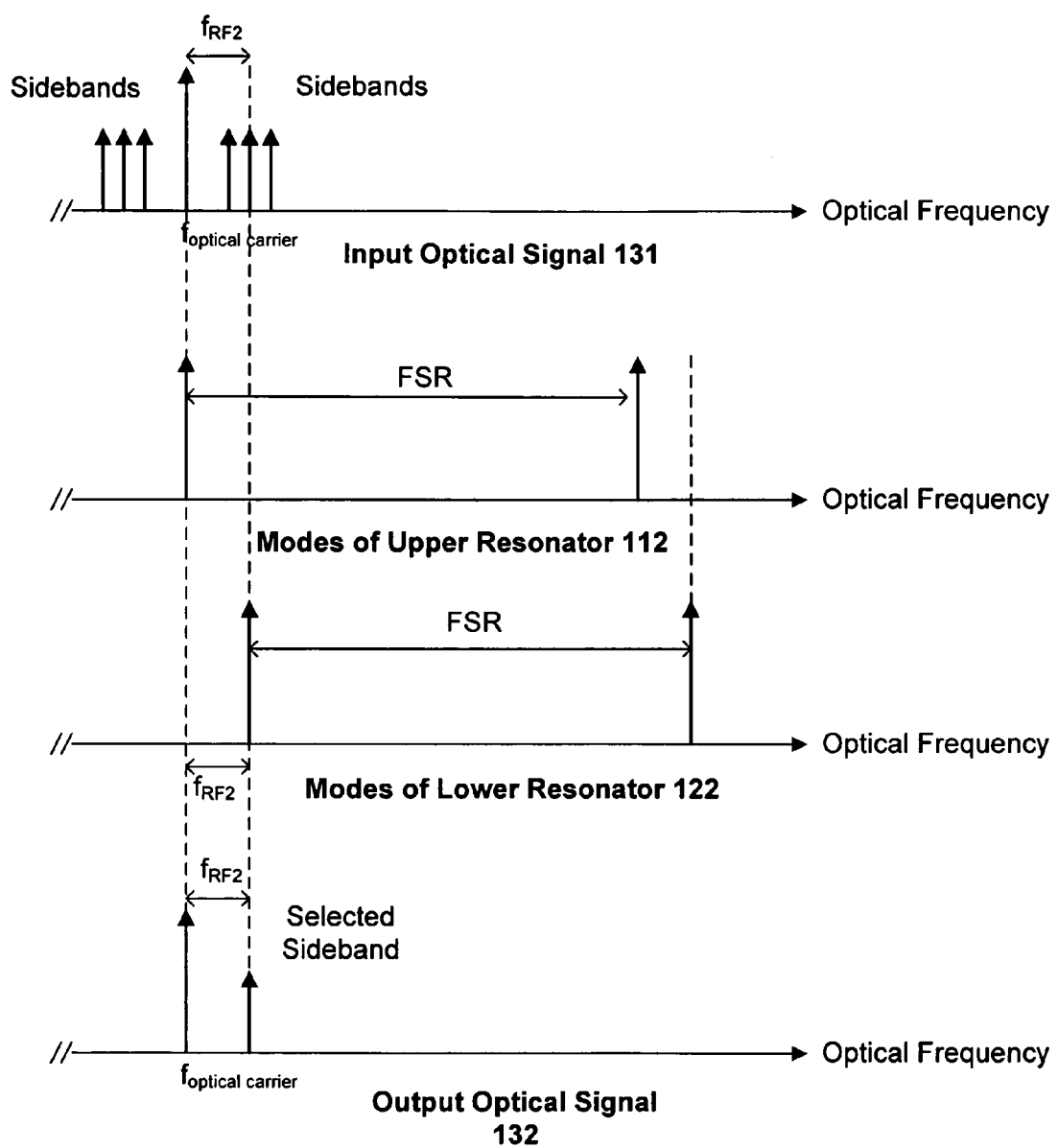
FIG. 2 illustrate the operation of the tunable filters in FIG. 1.

FIG. 2 illustrates the operation of the filter 100 in FIG. 1. Assume the input signal 131 has multiple sidebands that carry information on a beam at an optical carrier frequency. The resonator 112 is tuned so that one resonance peak is at the optical carrier frequency. The light at the optical carrier frequency is selected by the resonator 112 to transmit and the sidebands at other frequencies are rejected. The resonator 122 is detuned by a desired RF or microwave frequency from the resonance frequency of the resonator 112 to select one sideband to transmit while rejecting other sidebands and the optical carrier. Thus, the optical output 132 has both the optical carrier and the selected sideband. When the output 132 is detected by an optical detector, the sideband at the RF or microwave frequency is recovered. The FSR of the resonators 112 and 122 is designed according to the desired continuous tuning range of the filter and is at least twice of the tuning range.

Figure 3:
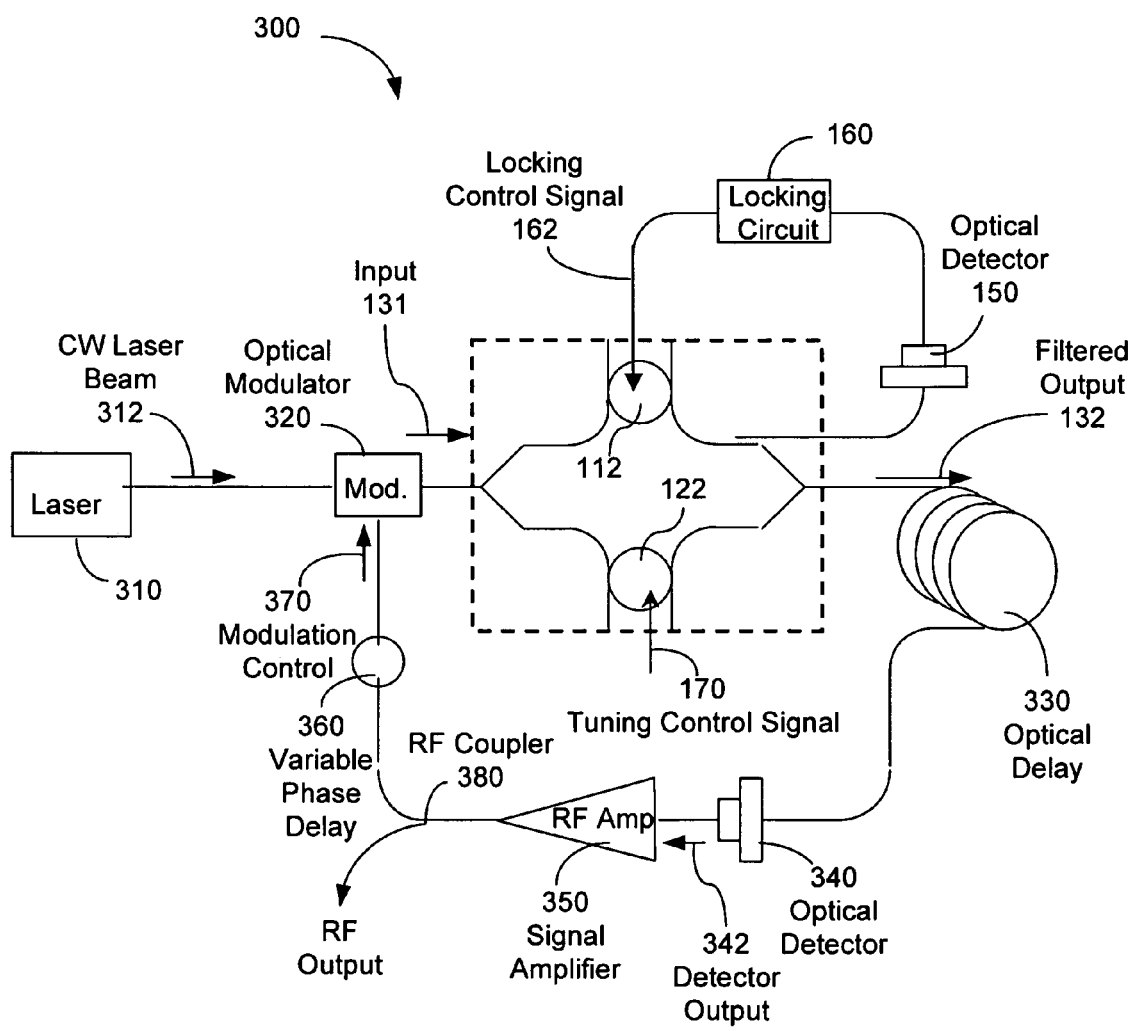
FIG. 3 shows a tunable opto-electronic oscillator that uses a tunable filter described in this application.

The above tunable filters may be used in opto-electronic oscillators. FIG. 3 shows one OEO 300 where an optical modulator 320 receives and responds to a modulation control signal 370 to modulate a CW beam 312 from a light source 310 such as a laser. This optical modulation produces an input beam 131. Next to the optical modulator 320 is the tunable optical filter shown in FIG. 1. The optical output 132 of the filter is directed into an optical delay element 330, which may be, e.g., a fiber delay line or an optical resonator, to produce a desired long delay to suppress noise in the oscillator 300. When the optical delay 330 is an optical resonator, certain phase matching conditions must be met. See, e.g., U.S. Pat. No. 6,567,436, the entire disclosure of which is incorporated herein by reference. An optical detector 340 is used to receive the optical output from the optical delay 330 and produces a detector output 342. This detector 340 is an interface from the optical portion of the OEO 300 to an electrical portion that connects between the optical modulator 320 and the detector 340. The detector output 342 is conditioned in the electrical portion to produce the modulation control signal 370 for the optical modulator 320. In the illustrated example, the electrical portion includes a signal amplifier 350 (e.g., an RF amplifier) and a variable phase delay 360. Hence, the opto-electronic feedback loop in the OEO 300 includes the optical modulator 320 as the interface from the electrical portion to the optical portion, the tunable filter, the optical delay 330, and the optical detector 340. The total loop gain is greater than the losses and the feedback is in phase so that an oscillation at the frequency determined by the difference between the first and second resonance frequencies of the resonators 112 and 122 can be sustained. The energy of the oscillation is obtained from the light source 310 and the amplifier 350. The oscillating signal from the OEO 300 is tunable in frequency by tuning the resonator 122. The optical signal in the OEO 300 can be tapped at any location in the optical section of the feedback loop to produce an optical output. Similarly, the electrical oscillation signal in the electrical portion of the feedback loop may be tapped to produce an RF or microwave output, e.g., by using a signal coupler 380 at the output of the amplifier 350.

Figure 4:
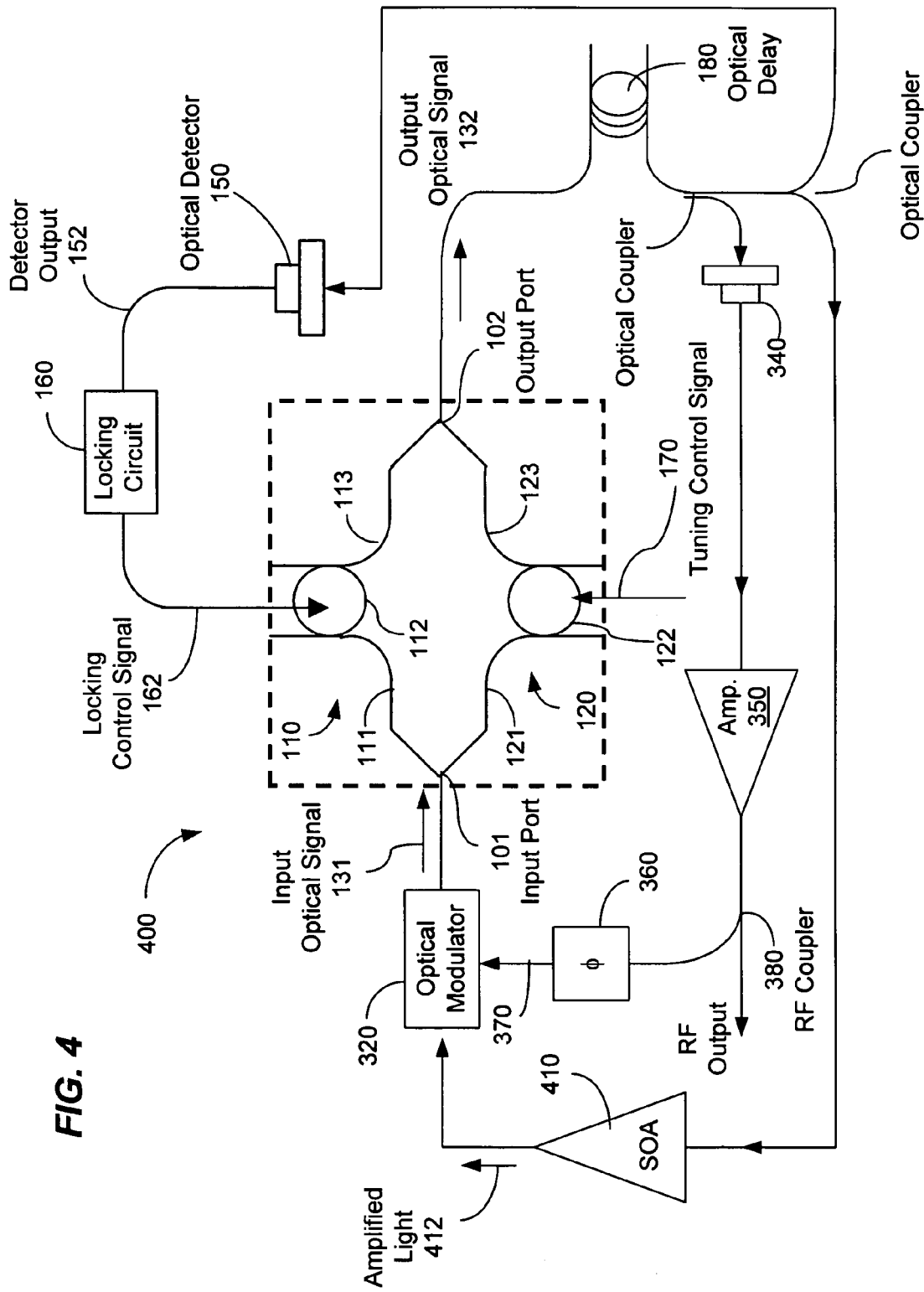
FIG. 4 shows a tunable coupled opto-electronic oscillator that uses a tunable filter described in this application.

FIG. 4 shows an example of a coupled OEO 400 that uses the tunable filter in FIG. 1. Referring to U.S. Pat. Nos. 5,929,430, and 6,567,436, a COEO directly couples a laser oscillation in an optical feedback loop to an electrical oscillation in an opto-electronic feedback loop. The laser oscillation and the electrical oscillation are correlated with each other so that both the modes and stability of one oscillation are coupled with those of the other oscillation.

In the specific example shown in FIG. 4, the optical feedback loop forms a ring laser cavity and includes the optical modulator 320, the tunable filter 100 in FIG. 1, and an optical gain medium 410, e.g., a semiconductor optical amplifier (SOA). The optical gain medium 410 amplifies the output light from the optical delay element 180 to produce the amplified light 412 as the input to the optical modulator. The optical gain from the gain medium 410 is greater than the optical losses in the loop to effectuate the laser oscillation. The opto-electronic loop in the COEO 400 includes the optical modulator 320, the tunable filter 100 in FIG. 1, the optical delay 180, the optical detector 340, and the electrical portion of the feedback (e.g., the amplifier 350 and the variable phase delay 360). The two loops are share the optical modulator 320, the tunable filter, and the optical delay 180. The open loop gain in the opto-electronic loop also exceeds the loss to sustain the electrical oscillation. The coupling between two feedback loops is achieved at the optical modulator 320 which modulates the gain in the optical loop by the modulation control signal generated by the opto-electronic feedback loop.

Figure 5:
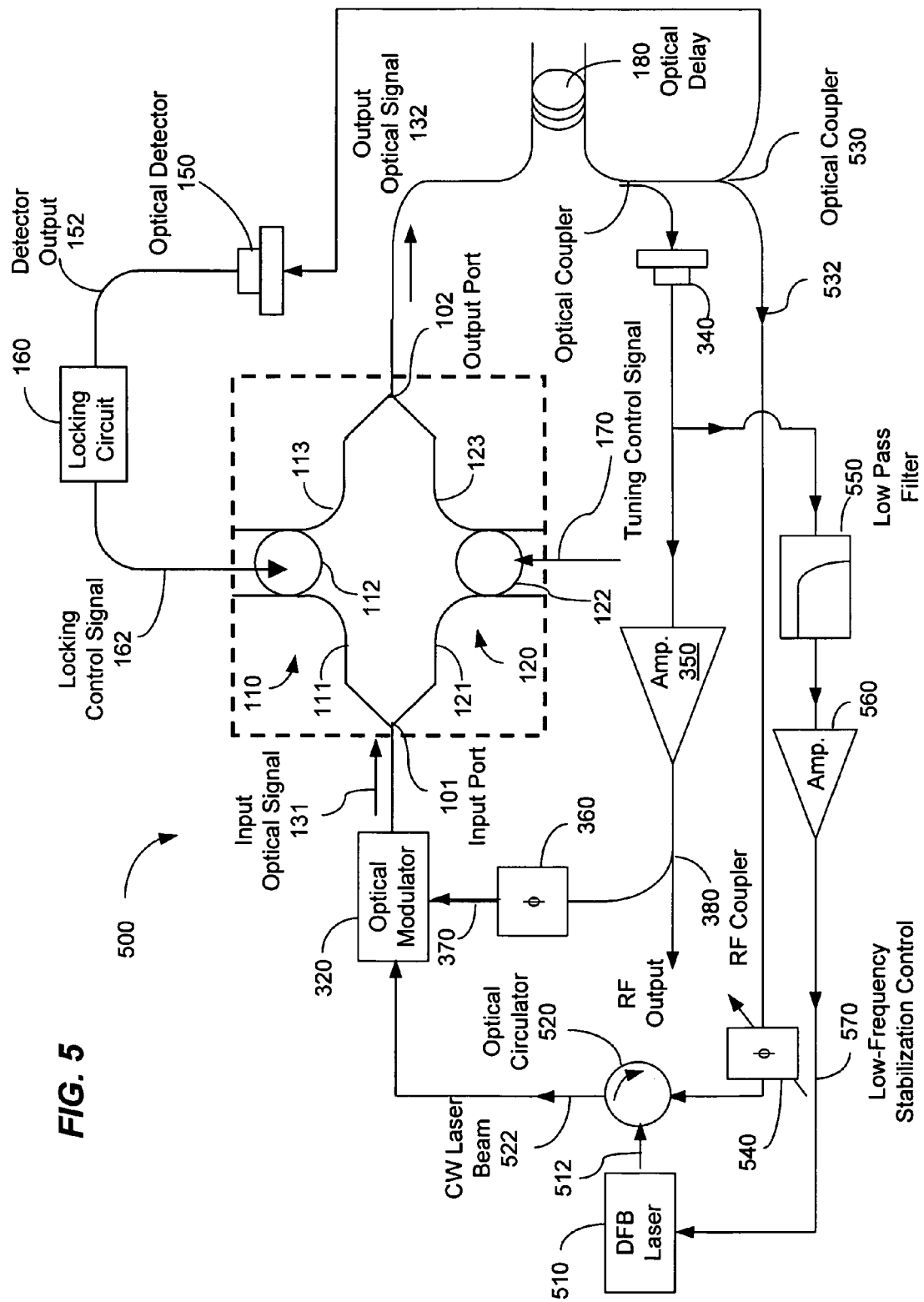
FIG. 5 shows a tunable opto-electronic oscillator that uses a tunable filter described in this application and a self-injection mechanism to stabilize the laser source.

FIG. 5 shows another example of an OEO 500 that further uses optical self injection to stabilize a laser 510 that produces the CW light supplied to the opto-electronic loop. The OEO 500 uses a tunable laser, such as a distributed feedback (DFB) semiconductor laser, as the laser 510 to produce the CW laser beam 522. The laser 510 has an output optical port 512 that exports the laser beam 522. In self injection locking, an external optical beam is injected back into the laser cavity via the output optical port 512 to stabilize the laser. In OEO 500, the optical signal in the optical section of the opto-electronic feedback loop is injected back to the laser 510 via the port 512 to stabilize the laser 510. An optical circulator 520 or another other suitable optical routing device may be used to direct the output beam 522 to the optical modulator 320 of the OEO 500 and to direct a portion of the optical signal in the OE loop to the laser 510. As illustrated, an optical coupler 530 is used to split a portion of the optical output from the optical delay 180 to produce the feedback optical signal 532. The optical circulator 520 directs the signal 532 into the laser 510. An optional variable optical phase delay 540 may be placed in the optical path of the optical feedback signal 532 to adjust the phase of the signal 532 for injection locking in the laser 510.

The laser 510 may exhibit low frequency drafts in its power and frequency due to various factors such as a change in temperature in the laser cavity. Such a drift may cause the laser 510 out of the locking condition by the optical injection. A low-frequency stabilization control mechanism, hence, may be provided to mitigate such drifts and to maintain the laser 510 locked in frequency. As illustrated, a portion of the detector output from the detector 340 in the electrical portion of the opto-electronic feedback may be processed to extract the low frequency component of the signal as a feedback signal to control the laser 510 so that the laser is adjusted to compensate for the drift. A low pass filter 550 may be used to filter the signal from the detector 340 where high frequency components are removed. Next, a signal amplifier 560 is used to amplify the filtered signal to produce the final feedback control signal 570 to the laser 510. As an example, this signal 570 is used to control the driving current to a DFB semiconductor laser used as the laser 510.

The above examples of OEO devices using the tunable filters described here use the opto-electronic feedback loop as the sole feedback loop to control the oscillation. One or more additional feedback loops may be used to control the optical modulator in the opto-electronic feedback loop to form multi-loop OEOs with the above tunable filters. Various multi-loop OEOs are described in U.S. Pat. No. 5,777,778 which is incorporated herein by reference. In a multi-loop OEO, the different feedback loops have different delays. The opto-electronic feedback loop with the longest delay is used to achieve low phase noise and narrow spectral linewidth. This loop is also used to provide fine frequency tuning since its mode spacing is smaller than any of the other feedback loops. On the other hand, the feedback loop with the shortest delay and the widest mode spacing, either opto-electronic or purely electronic, is used to provide a coarse frequency tuning to achieve a wide continuous tuning range. The total open loop gain of the multiple loops must exceed the total losses to sustain an opto-electronic oscillation but each loop may have an open loop gain less than the loss in that loop.

The optical delay element 330 in FIG. 3 or 180 in FIGS. 4 and 5 may be an optical resonator with a high quality factor and a low optical loss. A fiber ring cavity or a fiber Fabry-Perot cavity, for example, may be used as the optical delay 330 or 180. In one specific implementation, the delay element 330 or 180 may be a fiber cavity formed from a 20-meter fiber to have a free spectral range of about 10 MHz and a finesse of about 125. The optical coupling for the optical delay element 330 or 180 may be weak to maintain the high quality factor of the cavity.

The optical modulator 320 in the above described devices may be alternatively placed in the lower optical path 121 between the input port 101 and the tunable resonator 122. For example, the devices shown in FIGS. 4 and 5 may use this configuration.

In the above devices, the tunable resonators 112 and 122 may be implemented in various configurations, including ring resonators and whispering gallery mode (WGM) resonators. A suitable ring resonator may be formed in waveguide rings like fiber rings. A WGM resonator may be implemented in a number of configurations, including, microsphere WGM resonators, microdisk WGM resonators with spherical and non-spherical exterior surfaces, and microring WGM resonators with spherical and non-spherical exterior surfaces. The non-spherical exterior surfaces may be spheroidal surfaces of spheroids or conic surfaces. See, e.g., U.S. Pat. No. 6,795,481.

A tunable resonator suitable for the above devices and their variations may be implemented in various configurations. When a tunable WGM resonator is used, for example, the tuning may be achieved by thermal control of the resonator whose index, dimension, or both change with temperature, mechanical control of the resonator by changing the dimension of the resonator, electrical control, or optical control. Electro-optic materials may be used to control and tune the resonance frequency of the WGM resonator by an external control signal.

Figure 6A:
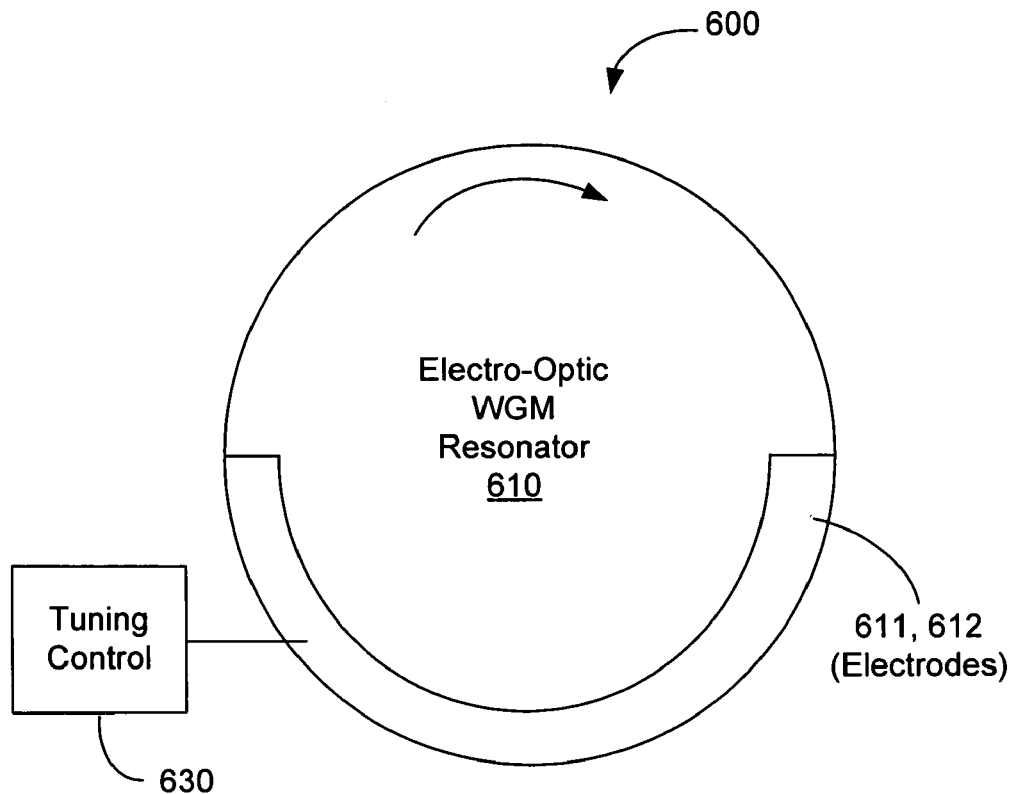
FIGS. 6A and 6B illustrate an example of a tunable whispering gallery mode optical resonator based on an electro-optic effect.
Figure 6B:
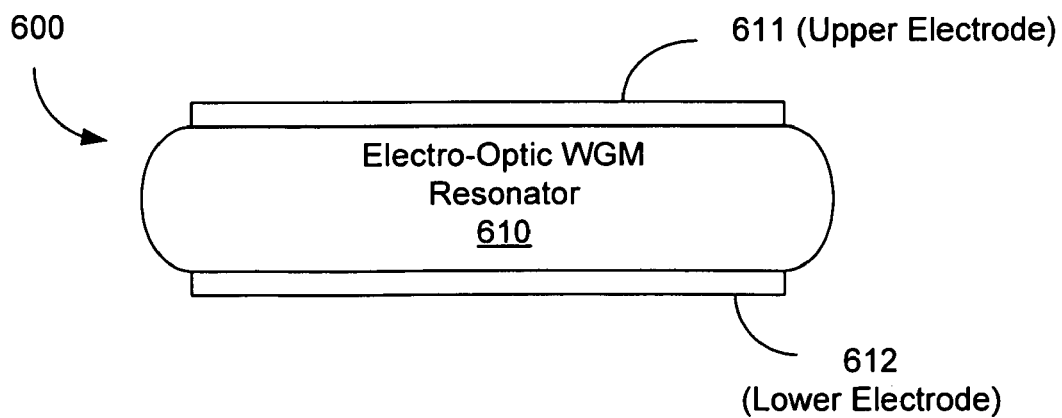

FIGS. 6A and 6B show an example of a tunable electro-optic WGM resonator 600 having a WGM resonator 610. The electro-optic material for the entire or part of the resonator 610 may be any suitable material, including an electro-optic crystal such as Lithium Niobate ("Lithium Niobate resonator") and semiconductor multiple quantum well structures. One or more electrodes 611 and 612 may be formed on the resonator 610 to apply a control electrical field in at least the region where the WG modes are present to control the index of the electro-optical material and to change the filter function of the resonator. Assuming the resonator 610 has disk or ring geometry, the electrode 611 may be formed on the top of the resonator 610 and the electrode 512 may be formed on the bottom of the resonator 610 as illustrated in the side view of the device in FIG. 6B. In one implementation, the electrodes 611 and 612 may constitute an RF or microwave resonator to apply the RF or microwave signal to co-propagate along with the desired optical WG mode. For example, the electrodes 611 and 612 may be microstrip line electrodes. The electrodes 611 and 612 may also form an electrical waveguide to direct the electrical control signal to propagate along the paths of the WG modes. A tuning control unit 630 such as a control circuit may be used to supply the electrical control signal to the electrodes 611 and 612.

In operating the tunable resonator 600, the control unit 630 may supply a voltage as the electrical control signal to the electrodes 611 and 612. The control voltage may be a DC voltage to set the resonance-peak of the resonator 600 at a desired spectral location. The DC voltage may be adjusted by the control unit 630 to tune the spectral position of the transmission peak when such tuning is needed. For dynamic tuning operations, the control unit 630 adjusts the control voltage in response to a control signal to, e.g., maintain the transmission peak at a desired spectral position or frequency or to change the frequency of the transmission peak to a target position. In some other operations, the control unit 630 may adjust the control voltage in a time varying manner, e.g., scanning the transmission peak at a fixed or varying speed or constantly changing the transmission peak in a predetermined manner.

For example, a Z-cut $LiNbO_3$ disk cavity with a diameter of d=4.8 mm and a thickness of 170 µm may be used as the resonator 610. The cavity perimeter edge may be prepared in the toroidal shape with a 100 µm radius of curvature. As an alternative to the strip electrodes shown in FIG. 6A, the top and bottom surfaces of the disk resonator may be coated with conductive layers for receiving the external electrical control signal. A metal such as indium may be used to form the conductive coatings. Tuning is achieved by applying and adjusting a voltage to the top and bottom conductive coatings. Each conductive coating may be absent on the central part of the resonator and are present at the perimeter edge of the resonator where WGMs are localized.

The above exemplary designs use a single optical resonator in each of the two optical paths of the Mach-Zehnder configuration. Although the resonance frequencies of two resonators respectively located in the two separate optical paths can be tuned relative to each other to tune the frequency of the filtered RF or microwave signal, the optical spectral profile of each optical resonator is fixed and cannot be changed. When the single optical resonator in each optical path is replaced by two or more optically cascaded tunable optical resonators, such cascaded tunable optical resonators form a composite optical filter. The resonance frequencies of the cascaded optical resonators can be controlled and tuned relative to one another to produce a reconfigurable or programmable filter spectral function in the optical transmission through the cascaded resonators. This use of the cascaded optical resonators can be used to produce a reconfigurable or programmable second order or higher order filter function for filtering the input RF or microwave signal. A second order or higher order filter function can be configured to have a sharper spectral roll-off that is desirable in filtering RF or microwave signals. Optical composite filters using cascaded optical resonators are described in U.S. patent application Ser. No. 10/702,201 entitled "OPTICAL FILTER HAVING COUPLED WHISPERING-GALLERY-MODE RESONATORS" and filed on Nov. 4, 2003, which is incorporated herein by reference in its entirety as part of this application.

Figure 7:
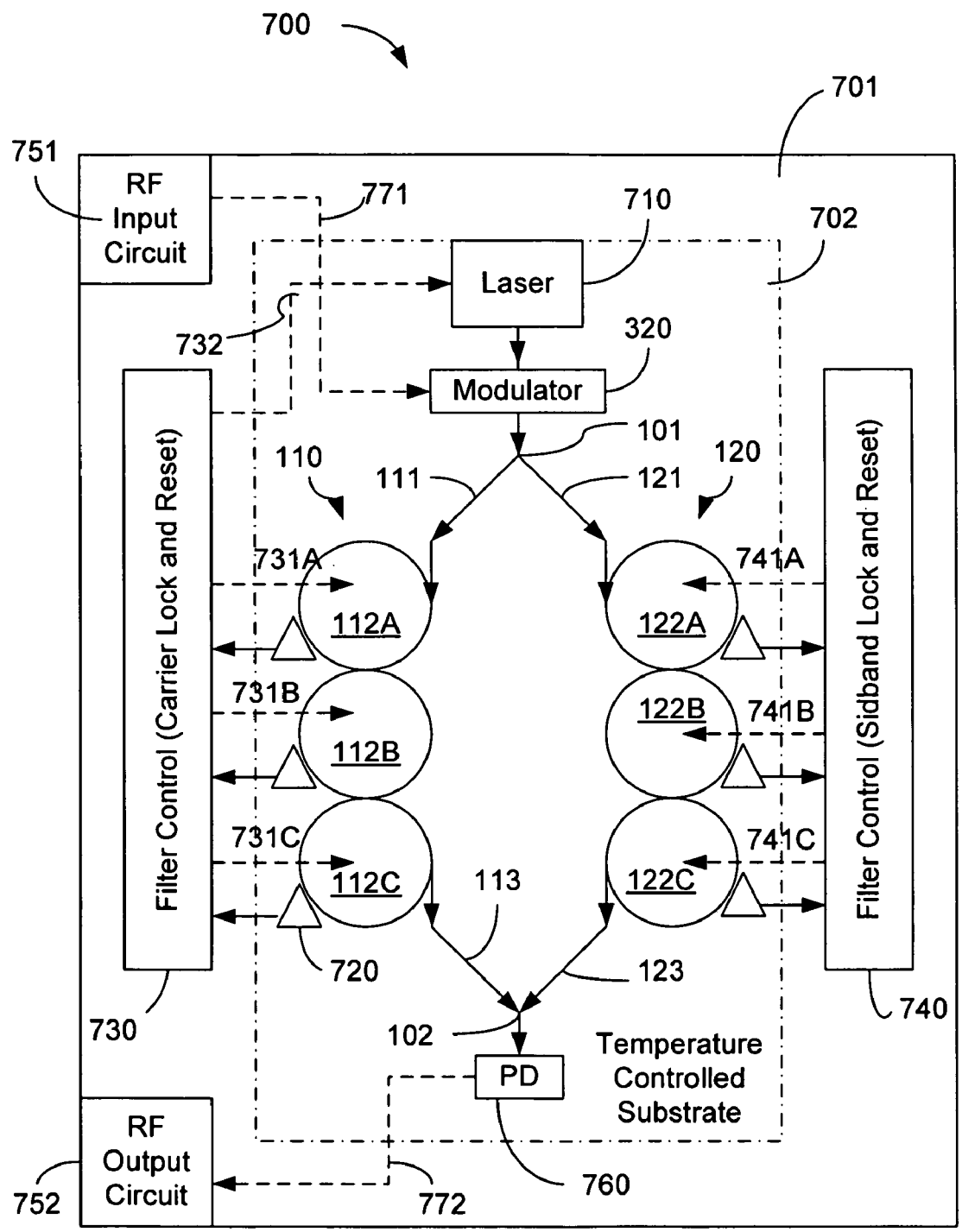
FIG. 7 shows another example of a tunable filter based on optical filtering using cascaded resonators.

FIG. 7 illustrates one example of a tunable RF or microwave filter 700 that implements two or more cascaded tunable optical resonators in each of the two optical paths to optically filter the RF or microwave signal. Three cascaded tunable resonators in each optical path are illustrated as an example. The filter 700 can be electronically programmed to act as a channel selection filter for an input RF or microwave signal in various frequency ranges, e.g., at frequencies of 500 MHz to 5 GHz and more with channel bandwidths of about 30 MHz to 300 MHz. In the example illustrated in FIG. 7, the filter 700 utilizes balanced cascaded Lithium Niobate tunable optical resonators with electro-optically tunable whispering-gallery modes.

The filter 700 is constructed on a base 701 which may be a substrate. An RF or microwave input circuit 751 on the base 701 is used to receive the input RF or microwave signal 771. An RF or microwave output circuit 752 on the base 701 is used to output the filtered RF or microwave signal 752. The filtering is performed optically. A laser 710 is provided to produce a CW laser beam at the laser carrier frequency. The laser 701 may be tunable to change its laser carrier frequency in response to a control signal 732. An optical modulator 3420 is provided to receive the input RF or microwave signal 771 and to modulate the CW light from the laser 701 to produce modulated light that carries in the input signal 771. Similar to other filters described above, the filter 700 has two parallel optical paths 110 and 120 between the input optical port 101 and the output optical port 102. The optical filtering is performed in the optical paths 110 and 120 where the input port 101 receives the modulated light from the optical modulator 320 and an optical detector 760 is used to convert the combined light at the output port 102 from the paths 110 and 120 into the filtered RF or microwave signal 772.

The optical path 110 is designed to transmit light at the laser carrier frequency and the optical path 120 is designed to tune its optical transmission at a desired signal spectral component or sideband while rejecting other optical spectral components and the laser carrier frequency. Different from other filters described above, each optical path implements two or more cascaded tunable optical resonators. More specifically, the optical path 110 includes a waveguide section 111 to receive light from the input port 101, cascaded tunable optical resonators 112A, 112B and 112C, and a waveguide 113 that directs light from the resonators to the output port 102. The resonator 112A is optically coupled to the waveguide 111 to receive light and couples the received light to the adjacent resonator 112B which further couples light to the resonator 112C. The resonator 112C couples light to the waveguide 113. The optical path 120 includes a waveguide section 121 to receive light from the input port 101, cascaded tunable optical resonators 122A, 122B and 122C, and a waveguide 123 that directs light from the resonators to the output port 102. The resonator 122A is optically coupled to the waveguide 121 to receive light and couples the received light to the adjacent resonator 122B which further couples light to the resonator 122C. The resonator 122C couples light to the waveguide 123. Since each resonator is a whispering gallery mode resonator, the coupling between the waveguide and the resonator and the coupling between two adjacent resonators are via evanescent fields.

The first tunable resonators 112A, 112B, and 112C in the optical path 110 are tuned to different resonant frequencies in order to produce a desired optical transmission spectral profile centered at the laser carrier frequency. The second tunable resonators 122A, 122B, and 122C in the optical path 120 are tuned to different resonant frequencies in order to produce a desired optical transmission spectral profile centered at the desired signal component or sideband. Each tunable resonator is implemented with an optical tap coupler 720 to allow for individual optical monitoring of each resonator. The tap coupler 720 evanescently couples a fraction of light out of each resonator and an optical tap detector is provided for each resonator to convert the light from the tap coupler 720 into a monitor signal. This coupled light is used to monitor whether the resonator being monitored is tuned at a proper resonant frequency to transmit the light. Each resonator is also individually controlled, e.g., by a control voltage when each resonator is made of an electro-optic material such as lithium niobate. Hence, the optical tap coupler 720 and the individual control of each resonator operate in combination to lock the resonators in each optical path at their respective resonant frequencies to preserve the desired optical transmission spectral line shape and the center frequency of the optical transmission. In operation, the cascaded resonators are sequentially monitored and adjusted one at a time. For example, in the optical path 110, the resonator 112A is first monitored and adjusted, the resonator 112B is next monitored and adjusted, and the resonator 112C is then monitored and adjusted.

As illustrated, the first tunable resonators 112A, 112B and 112C are controlled by control signals 731A, 731B and 731C, respectively. A filter control 730 is used to receive and monitor the detector outputs from the optical tap detectors for the optical tap couplers 720 and produce the control signals 731A, 731B and 731C to properly tune the resonators. The second tunable resonators 122A, 122B and 122C are controlled by control signals 741A, 741B and 741C, respectively. A filter control 740 is used to receive and monitor the optical outputs from the tap couplers 720 and produce the control signals 741A, 741B and 741C to properly tune the resonators. The functions of two filter controls 730 and 740 may be implemented in a single control unit in some implementations. A feedback control circuit may be used to control each individual resonator based on optical output from the optical tap coupler 720.

In one exemplary implementation, the input RF signal is sent through optional conditioning circuit/amplifier in the RF input circuit 771 into the broadband electro-optic or electro-absorption modulator, and is therefore upconverted into a sideband near the optical carrier signal provided by the laser 710. The modulated signal is then transmitted through an optical waveguide and is split into two optical branches equipped with cascaded electro-optically tunable high-Q lithium niobate resonators. Every resonator is electrically driven by an individual control line from the driver/controller. One branch 110 of cascaded filters 112A, 112B, and 112C is locked on the frequency of the laser carrier frequency. The other branch 120 is tuned to provide an optical filter for the sideband so that the offset frequency defines the center frequency for microwave filtering. Both signals are subsequently recombined at the output port 102 into the output optical waveguide which is followed by high-speed photodetector 760 that retrieves filtered microwave signal.

Both groups of optical resonators may be mounted on tight temperature controlled baseplate 702 which minimizes relative temperature excursions and provides the stability of center frequency of photonic filtering. The first tunable resonators in the optical path 110 and the second tunable optical resonators in the optical path 120 may be identical.

In summary, only a few implementations are disclosed. However, it is understood that variations and enhancements may be made.

What is claimed is what is described and illustrated, including:

1. A device, comprising:
   a laser to produce a laser beam at a laser carrier frequency;
   an optical modulator to modulate the laser beam in response to an input signal to produce a modulated laser beam that carries the input signal;
   an input optical port to receive the modulated laser beam;
   a first optical path coupled to the input optical port to receive a first portion of the modulated laser beam and comprising a plurality of first tunable optical resonators optically cascaded to transmit light at the laser carrier frequency through the first optical path;
   a second optical path coupled to the input optical port to receive a second portion of the modulated laser beam and comprising a plurality of second tunable optical resonators optically cascaded to transmit light at a selected optical frequency different from the laser carrier frequency through the second optical path;

an output optical port coupled to the first and second optical paths to combine transmitted light from the first and second optical paths to produce an output optical beam; and an optical detector to convert the output optical beam into an output signal carrying a signal component of the input signal at a frequency that is a difference between the optical carrier frequency and the selected optical frequency.

2. The device as in claim 1, further comprising:
a device control to control the first tunable optical resonators to lock the laser carrier frequency to optical transmission of the first tunable optical resonators and to control the second tunable optical resonators to tune the selected optical frequency relative to the laser carrier frequency.

3. The device as in claim 2, wherein the first and second tunable optical resonators support whispering gallery modes.

4. The device as in claim 2, further comprising:
a plurality of first optical tap couplers optically coupled to the first tunable optical resonators, respectively, each first optical tap coupler coupling a fraction of light out of a corresponding first tunable optical resonator;
a plurality of first optical tap detectors to receive light from the first optical tap couplers, respectively;
a plurality of second optical tap couplers optically coupled to the second tunable optical resonators, respectively, each second optical tap coupler coupling a fraction of light out of a corresponding second tunable optical resonator; and
a plurality of second optical tap detectors to receive light from the second optical tap couplers, respectively,
wherein the device control receives detector outputs from the first and second optical tap detectors and individually controls the first and second tunable optical resonators in response to the detector output.

5. The device as in claim 2, wherein the laser is a tunable laser and the device control operates to produce a control signal to tune the tunable laser when locking the laser carrier frequency to optical transmission of the first tunable optical resonators.

6. The device as in claim 1, further comprising a temperature controlled base on which the first and second tunable optical resonators are mounted.

7. The device as in claim 1, wherein each tunable optical resonator exhibits an electro-optic effect, and wherein the device control adjusts each tunable optical resonator via the electro-optic effect.

8. The device as in claim 1, wherein the first and second tunable optical resonators are identical.

9. A method for detecting an RF or microwave signal band carried by an optical signal, comprising:
splitting an optical carrier beam at an optical carrier frequency that is modulated to carry a plurality of RF or microwave signal bands at optical frequencies different from the optical carrier frequency into a first beam and a second beam;
directing the first beam through a first optical path having a plurality of optically cascaded first optical resonators that are in resonance at the optical carrier frequency to transmit, collectively, only light at the optical carrier frequency;

directing the second beam through a second, separate optical path having a plurality of optically cascaded second optical resonators that are in resonance at an optical frequency at which a selected RF or microwave signal band is carried to transmit, collectively, only light at the optical frequency at which the selected RF or microwave signal band is carried;
combining transmitted light from the first and second optical paths to produce an optical output; and
using an optical detector to receive the optical output to recover the selected RF or microwave signal band.

10. The method as in claim 9, further comprising:
optically monitoring light in each optical resonator; and
controlling each optical resonator according to the optical monitoring.

11. The method as in claim 10, comprising:
tapping light out of each optical resonator as a monitor signal;
measuring the monitor signal; and
controlling each optical resonator based on the measurement of the monitor signal.

12. The method as in claim 9, comprising:
controlling resonant frequencies of the optically cascaded second optical resonators, that are in resonance at the optical frequency at which the selected RF or microwave signal band is carried, to control an optical transmission spectral profile of the second optical path centered at the optical frequency at which the selected RF or microwave signal band is carried.

13. The method as in claim 12, comprising:
tapping light out of each second optical resonator as a monitor signal;
measuring the monitor signal; and
controlling each second optical resonator based on the measurement of the monitor signal to lock each second optical resonator at a respective resonant frequency to maintain the optical transmission spectral profile of the second optical path.

14. The method as in claim 9, comprising:
controlling resonant frequencies of the optically cascaded first optical resonators, that are in resonance at the optical carrier frequency, to control an optical transmission spectral profile of the first optical path centered at the optical carrier frequency.

15. The method as in claim 14, comprising:
tapping light out of each first optical resonator as a monitor signal;
measuring the monitor signal; and
controlling each first optical resonator based on the measurement of the monitor signal to lock each first optical resonator at a respective resonant frequency to maintain the optical transmission spectral profile of the first optical path.

16. The method as in claim 9, wherein:
two optically cascaded optical resonators that are next to each other are directly coupled to each other to transfer light without using a common optical waveguide to couple light from one resonator to another resonator.

17. The device as in claim 1, wherein:
two optically cascaded optical resonators that are next to each other are directly coupled to each other to transfer light without using a common optical waveguide to couple light from one resonator to another resonator.

* * * * *